US 8,898,654 B2
Nov. 25, 2014

(12) United States Patent
Young et al.

(10) Patent No.: US 8,898,654 B2
(45) Date of Patent: Nov. 25, 2014

(54) SECURE FIRMWARE UPDATES

(71) Applicant: Microsoft Corporation, Redmond, WA (US)

(72) Inventors: Robert D. Young, Kirkland, WA (US); Scott A. Fudally, Duvall, WA (US); Wallace Paul Montgomery, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/651,252

(22) Filed: Oct. 12, 2012

(65) Prior Publication Data

US 2014/0068585 A1 Mar. 6, 2014

Related U.S. Application Data

(63) Continuation of application No. 13/597,641, filed on Aug. 29, 2012.

(51) Int. Cl.
*G06F 9/44* (2006.01)
*G06F 9/445* (2006.01)

(52) U.S. Cl.
CPC ........................... *G06F 8/65* (2013.01)
USPC .......................................... 717/168

(58) Field of Classification Search
CPC .......................................... G06F 8/65
USPC ........................................... 717/168
See application file for complete search history.

(56) References Cited

U.S. PATENT DOCUMENTS

| 6,834,340 | B2* | 12/2004 | Lee et al. ........................ 713/100 |
| 7,069,452 | B1 | 6/2006 | Hind et al. |
| 7,974,416 | B2* | 7/2011 | Zimmer et al. ................ 380/281 |
| 8,275,560 | B2* | 9/2012 | Radhakrishnan et al. ...... 702/60 |
| 2003/0236970 | A1 | 12/2003 | Palmer et al. |

(Continued)

OTHER PUBLICATIONS

"STM32 Secure Firmware Upgrade (SFU) Overview", AN4023 Application Note, Available at <http://www.st.com/internet/com/TECHNICAL_RESOURCES/TECHNICAL_LITERATURE/APPLICATION_NOTE/DM00044227.pdf>, (Mar. 6, 2012), 3 pages.

(Continued)

*Primary Examiner* — Wei Zhen
*Assistant Examiner* — Lanny Ung
(74) *Attorney, Agent, or Firm* — Jeremy Snodgrass; Judy Yee; Micky Minhas

(57) ABSTRACT

A firmware update system is described that collectively handles secure firmware updates for hardware resources in a defined and consistent manner. The firmware update system may be configured to manage at least some firmware updates in a pre-boot environment (e.g., before an operating system is loaded). By doing so, the firmware update system exercises control over the updates and reduce entry points exposed to attackers. In one approach, update states are defined for hardware resources that are managed by the firmware update system. In a pre-boot environment, the update states for the managed hardware resources are set to enable firmware updates. The firmware update system may then detect and apply firmware updates available for the managed hardware resources. Update states may be set to disable before loading the operating so that firmware updates for managed resources are disabled outside of the secure pre-boot environment.

20 Claims, 6 Drawing Sheets

(56) References Cited

U.S. PATENT DOCUMENTS

| | | |
|---|---|---|
| 2005/0216753 A1 | 9/2005 | Dailey et al. |
| 2006/0143600 A1* | 6/2006 | Cottrell et al. ............... 717/168 |
| 2008/0250403 A1 | 10/2008 | Moon et al. |
| 2009/0327741 A1 | 12/2009 | Zimmer et al. |
| 2011/0022191 A1* | 1/2011 | Amit et al. ..................... 700/21 |
| 2011/0131447 A1* | 6/2011 | Prakash et al. ................. 714/19 |
| 2012/0102477 A1* | 4/2012 | Kim et al. ..................... 717/169 |
| 2012/0124567 A1 | 5/2012 | Landry |
| 2014/0068594 A1 | 3/2014 | Young |

OTHER PUBLICATIONS

Nystrom, Magnus et al., "UEFI Networking and Pre-OS Security", *Intel Technology Journal, vol. 15, Issue 1*, Available at <http://www.intel.com/technology/itj/2011/v15i1/pdfs/UEFI-Networking-and-Pre-OS-Security.pdf>, (Nov. 2011), pp. 80-101.

"International Search Report & Written Opinion for PCT Patent Application No. PCT/US2013/056688", Mailed Date: Nov. 21, 2013, Filed Date: Aug. 26, 2013, 8 Pages.

"Non-Final Office Action", U.S. Appl. No. 13/597,641, Sep. 11, 2014, 23 pages.

* cited by examiner

SECURE FIRMWARE UPDATES

RELATED APPLICATION

This application is a continuation of and claims priority under 35 U.S.C. §120 to U.S. patent application Ser. No. 13/597,641, filed on Aug. 29, 2012, the disclosure of which is incorporated by reference herein in its entirety.

BACKGROUND

Different hardware resources (e.g., modules, components, and devices) of a computing platform may have firmware for which updates are published from time to time. Traditionally, independent hardware vendors (IHVs) and original equipment manufacturers (OEMs) are responsible for handling firmware updates for their own hardware resources. Accordingly, different vendors and manufacturers may establish different, independent and/or proprietary mechanisms and systems for deploying and applying updated firmware, which generally operate in a post-boot environment (e.g., after an operating system is loaded by the computing platform). These multiple third-party mechanisms may create security threats by providing corresponding entry points that may be exploited to inject improper and/or malicious firmware for hardware resources. Accordingly, traditional firmware updates that are enabled in a post-boot environment present security threats that may potentially be used to take control of and/or cause harm to computing platform.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Secure firmware updates are described. In one or more embodiments, a firmware update system is implemented to collectively handle firmware updates for hardware resources in a defined and consistent manner. The firmware update system may be configured to handle at least some firmware updates in a pre-boot environment (e.g., before an operating system is loaded). By doing so, the firmware update system may exercise control over the updates and reduce the entry points exposed to attackers. In one approach, update states are defined for hardware resources that are managed by the firmware update system. In a pre-boot environment, the update states for the managed hardware resources are set to enable firmware updates. The firmware update system may then detect and apply firmware updates available for the managed hardware resources. Following application of the updates, the update states are set to disable firmware updates and the operating system is loaded. In the runtime environment of the loaded operating system, firmware updates are disabled for the managed hardware resources.

DETAILED DESCRIPTION

Overview

Traditionally, independent hardware vendors (IHVs) and original equipment manufacturers (OEMs) are responsible for handling firmware updates for their own hardware resources, which may expose uncontrolled entry points that attackers may take advantage of to inject malicious firmware.

Secure firmware updates are described. In one or more embodiments, a firmware update system is implemented to collectively handle firmware updates for hardware resources in a defined and consistent manner. The firmware update system may be configured to handle at least some firmware updates in a pre-boot environment (e.g., before an operating system is loaded). By doing so, the firmware update system may exercise control over the updates and reduce the entry points exposed to attackers. In one approach, update states are defined for hardware resources that are managed by the firmware update system. In a pre-boot environment, the update states for the managed hardware resources are set to enable firmware updates. The firmware update system may then detect and apply firmware updates available for the managed hardware resources. Following application of the updates, the update states are set to disable firmware updates and the operating system is loaded. In the runtime environment of the loaded operating system, firmware updates are disabled for the managed hardware resources.

In the discussion that follows, a section titled "Operating Environment" is provided and describes one environment in which one or more embodiments can be employed. Following this, a section titled "Secure Firmware Update Examples" describes example techniques and details in accordance with one or more embodiments. Last, a section titled "Example System" describes example computing systems and devices that can be utilized to implement one or more embodiments.

Operating Environment

Figure 1:
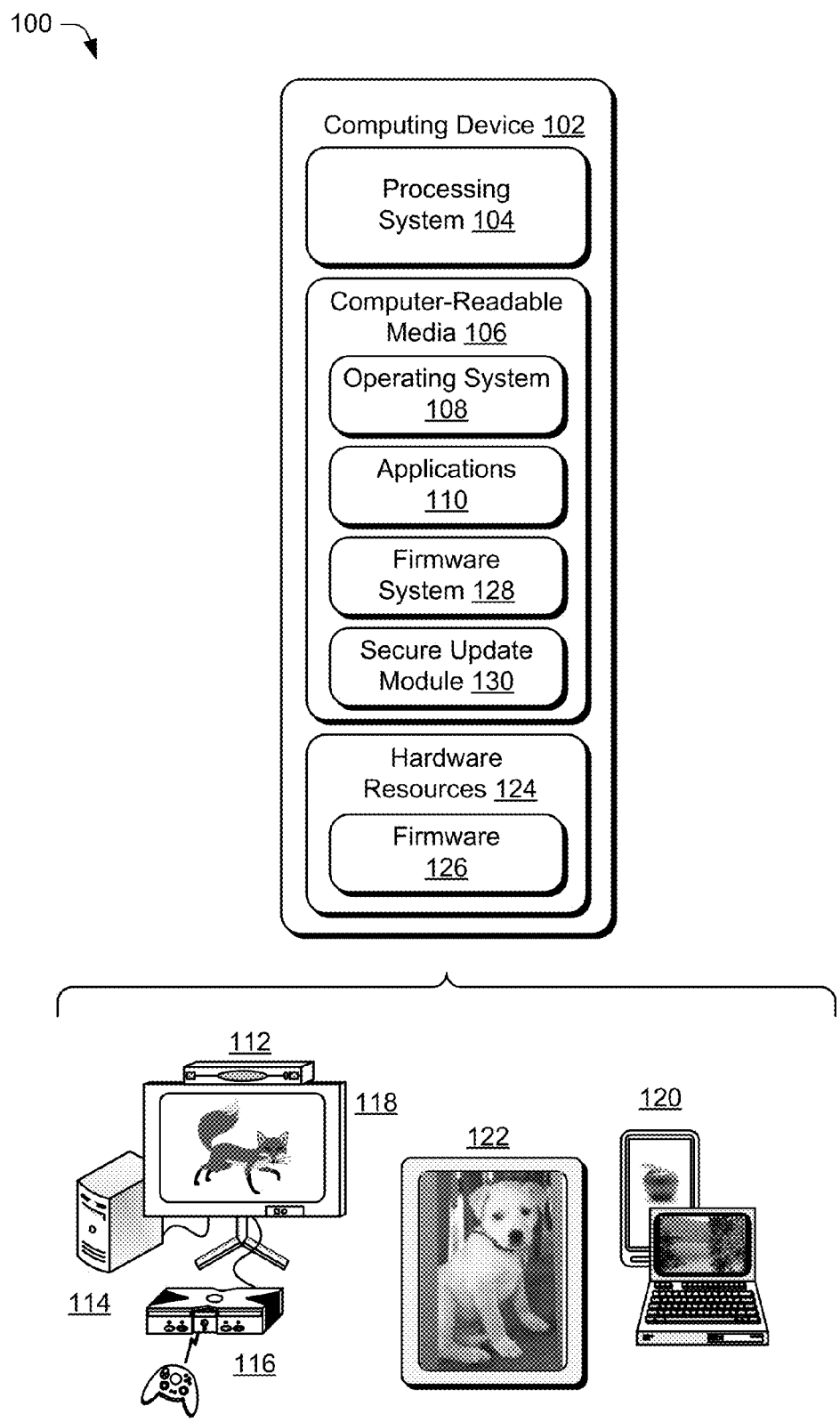
FIG. 1 illustrates an example operating environment in which one or more embodiments of secure firmware updates can be employed.

FIG. 1 illustrates an operating environment in accordance with one or more embodiments, generally at 100. The environment 100 includes a computing device 102 having a processing system 104, one or more computer-readable media 106, an operating system 108, and one or more applications 110 that reside on the computer-readable media and which are executable by the processor(s). The processing system 104 may be configured in various ways to retrieve and execute computer-program instructions from applications 110 to provide a wide range of functionality to the computing device 102, including but not limited to gaming, office productivity, email, media management, printing, networking, web-browsing, and so forth. A variety of data and program files related to the applications 110 can also be included, examples of which include games files, office documents, multimedia files, emails, data files, web pages, user profile and/or preference data, and so forth.

The computing device 102 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, and the like. For example, as shown in FIG. 1 the computing device 102 can be implemented as a television client device 112, a computer 114, and/or a gaming system 116 that is connected to a display device 118 to display media content. Alternatively, the computing device may be any type of portable computer, mobile phone, portable device 120, tablet or slate device 122, and/or may include an integrated display. Any of the computing devices can be implemented with various components, such as one or more processors and memory devices, as well as with any combination of differing components. One example of a computing system that can represent various systems and/or devices including the computing device 102 is shown and described below in FIG. 6.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 6.

The computing device 102 also includes a variety of different hardware resources 124 that represent different components and devices typically associated with the computing devices. The hardware resources 124 may include integrated components, removable components, and external peripheral devices connectable to the computing device 102 via wired and/or wireless connections. At least some of the hardware resources 124 have associated firmware 126 that may be updated in accordance with the techniques described above and below. Some example hardware resources 124 are discussed below in relation to FIG. 2.

The computing device 102 of FIG. 1 also includes a firmware system 128 and a secure update module 130 that reside on the computer-readable media and which are executable by the processor(s). The firmware system 128 represents functionality to implement a firmware interface and perform various techniques to collectively manage firmware updates for a plurality of hardware resources 124 as described above and below. The firmware system 128 may be implemented as a standalone component as depicted in FIG. 1. The firmware system 128 may also be implemented as an integrated component of the operating system 108.

The secure update module 130 represents functionality to implement techniques for secure firmware updates described above and below. In particular, the secure update module may manage updates for selected hardware resources of a computing device. Broadly speaking, this involves enabling updates for managed hardware resources in a pre-boot environment, invoking and interacting with the firmware system 128 to cause application of available firmware updates to occur in the pre-boot environment, and subsequently disabling firmware updates for the managed hardware resources prior to booting of the OS. In this way, firmware updates for the managed hardware resources are disabled outside of a secure pre-boot environment that is controlled by the secure update module 130. The secure update module 130 may be implemented as a standalone component as depicted in FIG. 1. Some functionality described herein in relation to the secure update module 130 and/or the firmware system 128 may also be implemented by a boot program for the computing device 102 and/or by the operating system 108.

Management of firmware updates by the firmware system 128 may include, but is not limited to, discovery of resources and detection, analysis, acquisition, distribution, installation, and tracking of firmware updates for particular resources that are registered or otherwise designated to obtain firmware updates through the firmware update system. Generally speaking, resources are identified that are designated for firmware handling by the system and available updates for the resources are detected. The firmware system 128 may further operate to acquire the updates in a suitable form and deploy/distribute the updates to appropriate resources to initiate installation. The firmware system 128 may also perform tracking of the updates to identify success or failure, record version information for installed firmware, enable rollbacks of firmware, and so forth.

In this manner, firmware updates may be performed securely in a pre-boot environment through the secure update module 130 in conjunction with the firmware system 128. Handling of firmware updates is offloaded to the firmware system 128, which is configured to collectively manage firmware updates on behalf of different hardware resources 124 and/or corresponding IHVs and OEMs. The secure update module 130 then operates to disable firmware updates outside of the pre-boot environment. These and other aspects are described in greater detail in relation to the following figures.

Figure 2:
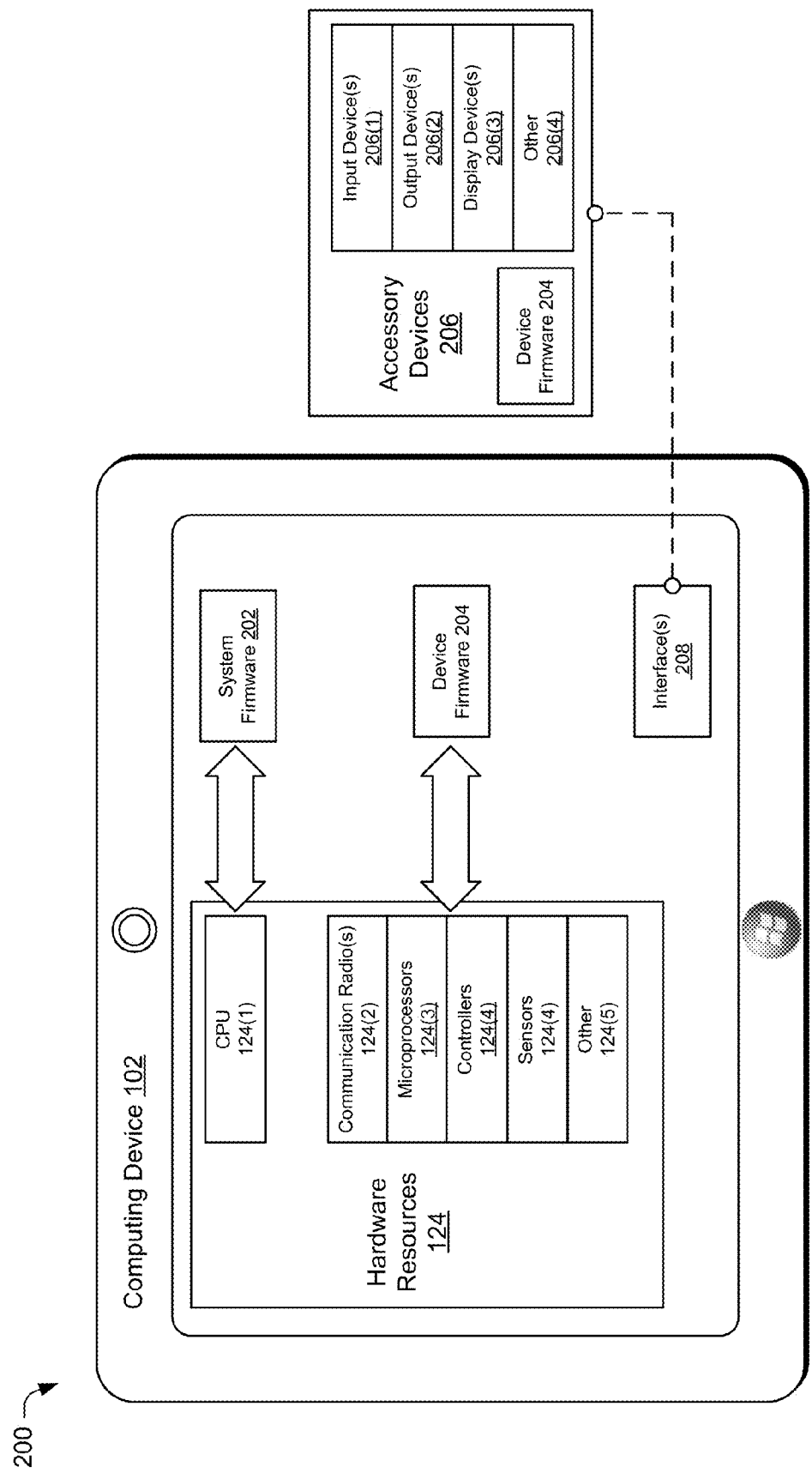
FIG. 2 is a diagram showing example resources of a device in accordance with one or more embodiments.

A variety of different hardware resources 124 that may be designated for management by the firmware system are contemplated. By way of example and not limitation, FIG. 2 depicts generally at 200 some representative hardware resources 124 in relation to an example computing device 102. The computing device 102 shown in FIG. 2 includes system firmware 202 that may be associated with the particular processing system, architecture, and/or platform for the device, which in this example is depicted as central processing unit (CPU) 124(1) that may be configured in various ways. For example, the CPU may be implemented as a system-on-chip (SoC) processor that is configured to include multiple different integrated hardware components as a single chip. Other types of CPU architectures including ARM-based and x86 architectures are also contemplated. Various other example hardware resources shown in FIG. 2 that may have corresponding device firmware 204 that is updateable include different communication radios 124(2) (e.g., WiFi, mobile broadband, Bluetooth, Near Field Communication (NFC) etc.), microprocessors 124(3), sensors 124(4) (e.g., camera, gyroscope, accelerometer, GPS, pressure sensor, proximity sensor, etc.), controllers 124(4) (e.g., touch controller, audio/video controller, memory controller, USB controller, etc.), and other 124 (5) integrated hardware resources of the computing devices.

The techniques for secure firmware updates described herein may also be applied to accessory devices 206 that are connectable to the computing device 102 via corresponding interfaces 208. A variety of different accessories are contemplated that may be connected via wired and/or wireless interfaces. The accessory devices 206 include external peripheral devices and/or removable, swappable devices that are configured to be received and connected by way of a corresponding port, bay, or other integrated connection portion of the computing device 102. Different accessory devices 206 may be connected to the computing device 102 at different times. At least some accessory devices 206 are configured as hot swappable (e.g., plug and play) devices. By way of example and not limitation, accessory devices 206 may include input devices 206(1) (e.g., keyboard, mouse, stylus, etc.), output devices 206(2) (e.g., speakers, a headset, a printer, etc.), and display devices 206(3), as well as various other 206(4) devices such as a game controller, power adapter, musical accessory device, and so forth. Accessory devices 206 may have associated firmware 204 maintained on the devices as depicted in FIG. 2 that may be updated through the firmware system.

Each resource may accordingly have its own associated device firmware 204. Updates to device firmware 204 may be matched to resources and applied on an individual basis to both integrated and accessory devices. Additionally or alternatively, device firmware 204 for some resources may be updated as part of an update to system firmware 202 in a combined manner. For example, a plurality of microprocessors, controllers, and other components may be integrated as part of the SoC processor or other CPU and may be updated together. Generally, the secure firmware updates described herein may be selectively applied in a pre-boot environment to a selected group of designated hardware resources which may include both integrated components and accessory devices. The designated hardware resources for management through the system may be selected as core components of the computing device according to various criteria. For example, core hardware resources may include those resources that are developed by or closely associated with the computing device manufacturer, associated with partner OEMs/IHVs, considered critical to device operation and user experience, such as core processing/memory/display components, and/or provided as part of the device design and/or default configuration. Integrated components of a SoC design are one example of core hardware resources that may be designated for collective management via the system. Multiple other microprocessors, controllers, and/or other individual components may also be designated for management of firmware through the system.

In some cases, firmware updates for some non-chosen hardware resources may be managed outside of the firmware system 128 and/or in a post-boot environment using traditional techniques. In one or more embodiments, though, the secure update module 130 may be configured to restrict or prevent any firmware updates from occurring outside of the pre-boot environment. In this approach, the secure update module 130 is implemented to control firmware updates for each hardware resource 124 of a computing device through the firmware system 128 in a secure manner.

Having described an example operating environment, consider now example details regarding secure firmware updates in accordance with one or more embodiments.

Secure Firmware Update Examples

In the following section, implementation details and example techniques for a secure firmware updates are discussed. The discussion includes some example procedure(s) that can be implemented in connection with any suitable hardware, software, firmware, or combination thereof. In at least some embodiments, the procedures may be implemented by way of a suitability configured computing device, such as the example computing device 102 of FIG. 1 that includes or otherwise makes use of a firmware system 128 and secure update module 130.

Figure 3:
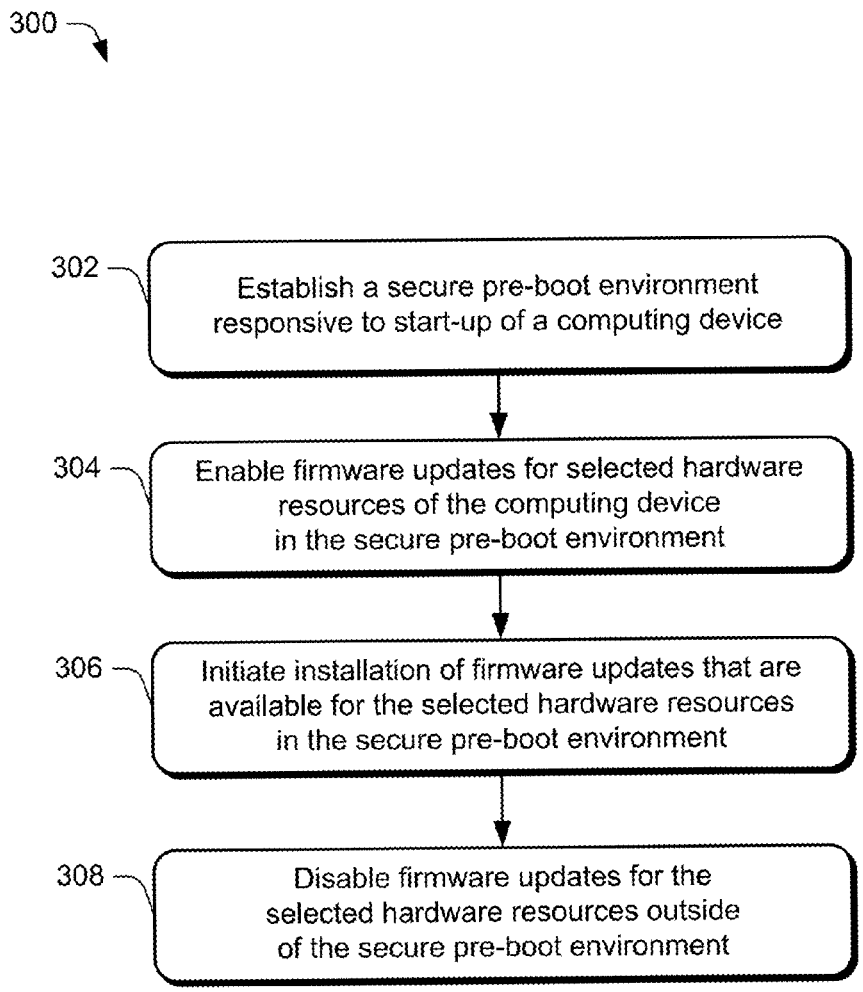
FIG. 3 is a flow diagram that describes details of an example procedure in accordance with one or more embodiments.

FIG. 3 depicts an example procedure 300 in which secure firmware updates are performed in a pre-boot environment. A secure pre-boot environment is established responsive to start-up of a computing device (block 302). In particular, when a computing device is powered-up or restarted, an integrated boot program built into the device generally executes to initialize the system, run self-tests, and identify hardware resources 124 of the system. Further, the boot program may also perform operations to configure the hardware resource for use and load an operating system for the device.

The boot program may include or make use of a firmware system 128 and/or secure update module 130 as described herein. The firmware system 128 and/or secure update module 130 provides a firmware interface configured to initialize hardware resources, load appropriate drivers for the resources, and otherwise perform operations defined for a boot sequence to set-up the system. The techniques described herein may be implemented in conjunction with various different types of firmware systems. Examples of suitable firmware systems include but are not limited to Unified Extensible Firmware Interface (UEFI), Advanced Configuration and Power Interface (ACPI), Basic Input Output System (BIOS) interfaces, and/or custom Application Programing Interfaces (APIs).

The secure update module 130 may also be configured to implement a secure boot mode for the device. Secure boot mode provides a secure pre-boot environment that prevents untrusted, unrecognized, and/or malicious code from executing. In particular, the secure update module 130 may implement and enforce a security policy that defines what kinds of programs and boot services are able to run and restricted in the pre-boot environment. Various techniques to verify code may be employed to ensure that any code allowed to run in the secure boot mode is trusted. For example, a trust determination may be made by checking digital signatures associated with code against digital keys associated with known, trusted entities. Assuming that a digital signature corresponding to code is determined to be valid, the code may be designated as trusted and is allowed to run. On the other hand, code which is un-signed or does not have a valid digital signature may be designated as un-trusted and execution of the un-trusted code may be prevented. Additionally, the secure update module 130 may ensure that the boot program and/or a corresponding operating system to load on the computing device are trusted.

Firmware updates for selected hardware resources of the computing device are enabled in the pre-boot environment (block 304). Here, hardware resources may be configured to switch between different update states so that firmware updates may be selectively enabled and disabled. This may occur in various ways. For example, firmware 126 associated with hardware resources 124 may be configured to toggle a data field defined to control firmware updates between an update enabled state and an update disabled state in response to corresponding events, input, and/or triggers. In one approach, a Boolean field or other suitable update state data object/parameter associated with hardware resources 124 may be set by default to enable updates when a computing device is powered-on or reset. In addition or alternatively, the secure update module 130 may be configured to send a command as part of a boot sequence that causes hardware resources 124 to enable firmware updates. In response to the enable command, firmware or other code associated with the hardware resources 124 may set an appropriate data field or otherwise take action to enable firmware updates.

Installation of firmware updates that are available for the selected hardware resources are initiated in the secure pre-boot environment (block 306). In particular, secure firmware updates are applied in a pre-boot environment to a selected group of designated hardware resources which may include both integrated components and accessory devices as noted above. Updates may be enabled in the secure pre-boot environment for the designated hardware resources by default, in response to an appropriate command, or otherwise.

As mentioned, the firmware system 128 is configured to manage firmware updates, which includes discovery of resources and detection, analysis, acquisition, distribution, installation, and tracking of firmware updates for particular resources that are registered or otherwise designated to obtain firmware updates through the firmware update system. Updates may be discovered, obtained and applied using various different techniques including techniques associated with UEFI, ACPI, and/or BIOS firmware interfaces. Propriety and custom APIs and code to implement firmware updates may also be employed in some scenarios.

In the context of firmware updates, any updates that are applied in the secure pre-boot environment conform to an established security policy. Thus, update packages handled and applied by the firmware system are digitally signed and identified as trusted by the system. As part of the update process, the system may examine available updates and/or installed versions of firmware to verify that the versions are correct, the firmware is correctly matched to resources of the platform, and that the firmware is secure/trusted. The system may be further configured to flag or report any issues and automatically attempt to correct any deficiencies by locating and re-applying correct firmware in appropriate circumstances.

Additionally, a delayed firmware update feature may be implemented to stage updates for devices that may be unavailable, such as a disconnected accessory device. In this case, the system may obtain an available update and continue to check for the corresponding resource on each re-boot until the device is available. The update is then applied to the appropriate resource. In one approach, some hardware resources (e.g., a designated CPU or microcontroller) may be configured to pass-through firmware updates updates to other resources including delayed. In this approach, a "master" resource may stage updates for other components at the direction of the firmware system and then handle interactions with the other components to apply the updates. This may include checking for availability of the components upon start-up and distributing the updates as appropriate.

Following application of any available updates, firmware updates for the selected resources are disabled outside of the secure pre-boot environment (block 308). In this manner, the firmware system 128 may control firmware updates for managed devices such that updates are performed within the secure pre-boot environment and prevented outside of this controlled environment. To disable firmware updates for managed devices, the secure update module may communicate an appropriate command to hardware resources 124 that causes hardware resources to disable firmware updates. A disable command or other comparable techniques may also be employed to disable updates and bypass the firmware update process when a secure pre-boot environment cannot be established by the system. Another option is to associate a timer with a device that sets a limited time period for updating firmware. Updates may then be disabled according to the timer as described in greater detail below. As with the previously described enable command or enable on start-up behavior, firmware or other code associated with the hardware resources 124 may set an appropriate data field or otherwise take corresponding action in response to the disable command to disable firmware updates.

The boot program may then pass control and hand-off processing to a boot loader to load the operating system with firmware updates being disabled for the managed devices. Accordingly, firmware updates are disabled in the runtime environment for the OS. Since firmware updates are disabled at the device level, potential entry points exposed at runtime cannot be used to install malicious firmware. Further details regarding these and other aspects of secure firmware updates are discussed in relation to the following example procedures.

Figure 4:
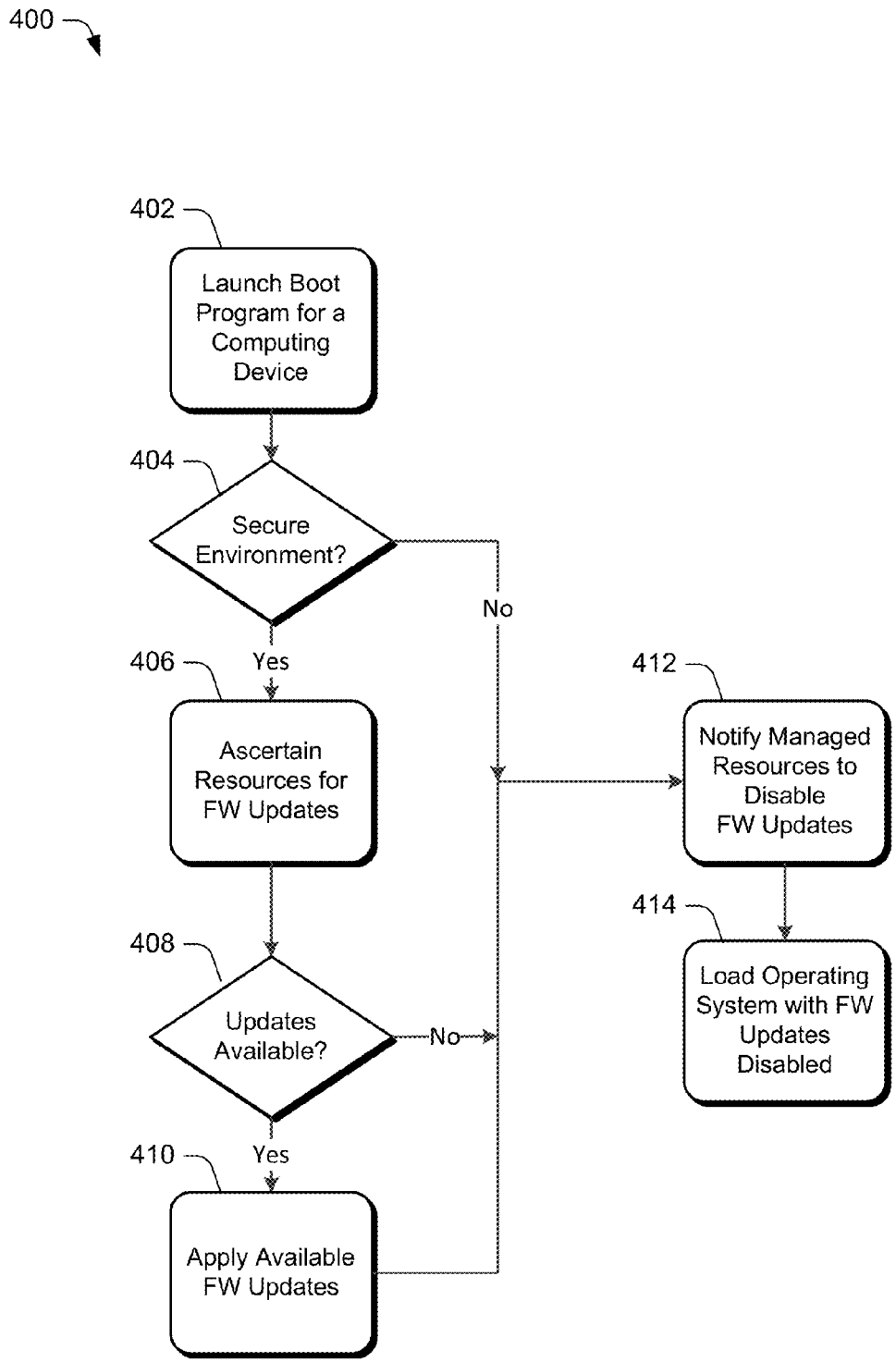
FIG. 4 is a flow diagram that describes details of another example procedure in accordance with one or more embodiments.

FIG. 4 depicts a procedure 400 representing example logic for secure firmware updates in accordance with one or more embodiments. A boot program for a computing device is launched (block 402). For instance, default boot code to handle start-up/initialization of the computing device may be executed when the computing device is powered-on or reset. As mentioned previously, the boot program implements a boot sequence to initialize the computing device and associated hardware resources 124. The boot program may also control updates to firmware 126 associated with the hardware resources 124 by invoking or otherwise interacting with a secure update module 130 configured to implement secure firmware updates.

A determination is made regarding whether a secure environment is established by the boot program (block 404). For instance, the secure update module 130 may implement a secure boot mode. Secure boot mode may be employed as an exclusive or optional boot mode for devices to provide a secure pre-boot environment in which un-trusted code is restricted and/or prevented from executing. For some devices, a user-selectable option may be set to control whether or not secure boot mode is active. Another user-selectable option may control whether or not secure firmware updates are active. As a precursor to applying available firmware updates, the secure update module 130 may perform one or more checks to determine whether secure boot mode and secure updates are active. If secure boot mode is active, the secure update module 130 also determines if a secure pre-boot environment has been successfully established.

A firmware update process may be selectively performed based upon the results of the above-mentioned determinations. Generally, secure firmware updates for managed resources are applied when the secure pre-boot environment is established. The firmware update process may be bypassed, however, if the secure pre-boot environment cannot be established because secure boot mode is deactivated or for some other reason.

Assuming, a secure environment exists per block 404, hardware resources that are designated for management of firmware updates through the firmware system are ascertained (block 406). Then, a determination is made regarding whether there are updates available for the managed hardware resources ascertained per block 404 (block 408). If updates are available, then the available updates are applied (block 410). Block 410 represents various techniques and operations that may be employed to implement firmware updates.

By way of example, the firmware system 128 and/or operating system 108 may be configured to reference a data structure in a defined format that identifies and describes properties of hardware resources 124 and corresponding firmware 126 associated with a computing device 102. The data structure provides a mechanism for identifying system firmware, device firmware, and accessory device firmware for updating to the system. In at least some embodiments, core system firmware is responsible for allocating and populating the data structure in the designated format. In addition or alternatively, the boot program may operate to create and populate the data structure to enumerate hardware resources associated with the computing device. This may occur during a boot sequence for the computing platform. A different instance of the data structure may be instantiated for each boot sequence to reflect current data for the firmware resources. The data structure may be exposed via UEFI or another suitable interface (e.g., ACPI, BIOS, custom APIs, etc.). The firmware system 128 and/or secure update module 130 may then make use of data entries regarding resources contained in the data structure to discover resources, configure firmware updates, deploy the updates, and otherwise set-up and handle firmware updates for devices enumerated in the data structure.

As but one illustrative example, the data structure may be configured as a table for a Unified Extensible Firmware Interface (UEFI) system. The UEFI is a standard that defines parameters of an interface between an operating system and firmware for a platform in the pre-boot environment. The UEFI provides standard conventions for describing aspects of a platform to the OS through functions, methods, tables, and so forth. Specifically, the UEFI provides infrastructure, conventions, and techniques for data exchange and interaction between system boot code and a boot loader of the OS during booting. In at least some embodiments, the infrastructure defined per UEFI may be leveraged to create a suitable data structure for implementation of secure firmware updates. Nonetheless, it should be appreciated that a variety of other kinds of techniques, systems, tables, databases, and/or data structures may also be employed to enumerate hardware resources to the firmware system in a comparable manner.

Entries in a suitable data structure identify and describe hardware resources that have updateable firmware. This may include resource types and categorization data; instructions/ details regarding how to interact with the resources and update the resources; links, locations, and/or addresses that may be used to register for, download, or otherwise obtain updates; and so forth. Moreover, metadata for the entries may record status/version information corresponding to the described resources. A variety of different fields may be defined for entries to capture information that is sufficient to enable the secure update module 130 to set-up and carry out updates. In at least some embodiment, the different fields include an update state field as described previously that may be selectively set in accordance with techniques described herein to enable or disable firmware updates for corresponding resources. The update state fields associated with entries in the data structure reflect corresponding update state fields contained within firmware associated with hardware resources that are enumerated. Accordingly, setting a value of the update state field for a particular resource may cause a change to the value within firmware for the particular resource.

It is once again noted that the above described table and/or UEFI implementations are provided as illustrative examples of data structures suitable for use by a firmware update system. In practice, a variety of different formats and techniques for exposing data regarding hardware resources may be employed. For example, a table or other data structure comparable to the foregoing examples may be configured for other kinds of interfaces between an OS and system boot code including, but not limited to, ACPI, custom APIs, and BIOS interfaces.

The firmware update process employed may vary depending upon the particular type of firmware system 128 that is implemented. Generally, though, the secure update module 130 may check whether updates are available for resources identified from the exposed data structure. For instance, firmware version information contained in the data structure may be compared with published updates to determine if firmware currently installed for resources is up-to-date. The secure update module may then locate and obtain available updates for out-of-date firmware in a manner prescribed by the particular firmware system. The secure update module 130 may also examine digital signatures and/or other credentials associated with the updates to make a trust determination as previously described. Trusted updates may be applied within the secure pre-boot environment. This may involve distributing update packages that are trusted for consumption by corresponding hardware resources to apply the updates. Update packages may be configured and distributed in accordance with UEFI or another firmware system implemented by the platform. In another approach, the secure update module 130 may be configured to apply the updates on behalf of at least some hardware resources. On the other hand, the secure update module 130 may be configured to reject un-trusted updates by discarding, deleting, ignoring, quarantining, or otherwise preventing the un-trusted updates from being executed and applied by the system.

Once available updates are handled as directed by the secure update module, a notification is sent to the managed resources to cause the managed resources to disable firmware updates (block 412). This effectively disables firmware updates for managed devices outside of the secure pre-boot environment. The notification may contain a disable command for processing by hardware resources. In particular, firmware of hardware resources 124 may be configured to handle commands from the firmware system 128 to enable or disable firmware updates as directed. A global notification message may be sent to multiple resources. In addition or alternatively, device specific messages may be sent to at least some resources.

Moreover, for some resources, timers may be used to control firmware updates and prevent updates from occurring outside of a defined time period. For instance, a timer may be set when the device powers-up, which enable updates for a defined time period after power-up. When the timer expires, updates are automatically disabled. In this approach, the length of the timer may be set to less than an expected time for the boot sequence so that updates are disabled before the OS loads.

The operating system may then be loaded with firmware updates disabled for the managed resources (block 414). Here, processing may be handed-off to a boot loader after firmware updates are disabled in the described manner. The boot loader then handles booting of the OS. In the runtime environment for the OS, attempts to update firmware of managed hardware resources are rejected since these resources have been set to disable updates at the device level.

When updates are not available per block 408, the procedure 400 may proceed to the disable notification at block 412 and operating system loading of block 414 directly without performing the operations to apply updates represented by block 410. Likewise, in the case that a secure environment does not exist per block 404, the procedure 400 may disable updates by way of a disable command per block 412 and then load the operating system be block 414. In this case, the system may bypass firmware updates altogether when a secure environment is not available.

In some cases, the boot program may generate an error message when the secure environment is not available. A prompt may be presented to request input from a user regarding options to handle the error. For example, the user may be prompted to indicate whether to abort the load, start normally, start in a safe-mode that provides a reduced set of functionality, and so forth. Alternatively, the system may be configured to automatically abort the boot sequence when a secure environment does not exist.

Figure 5:
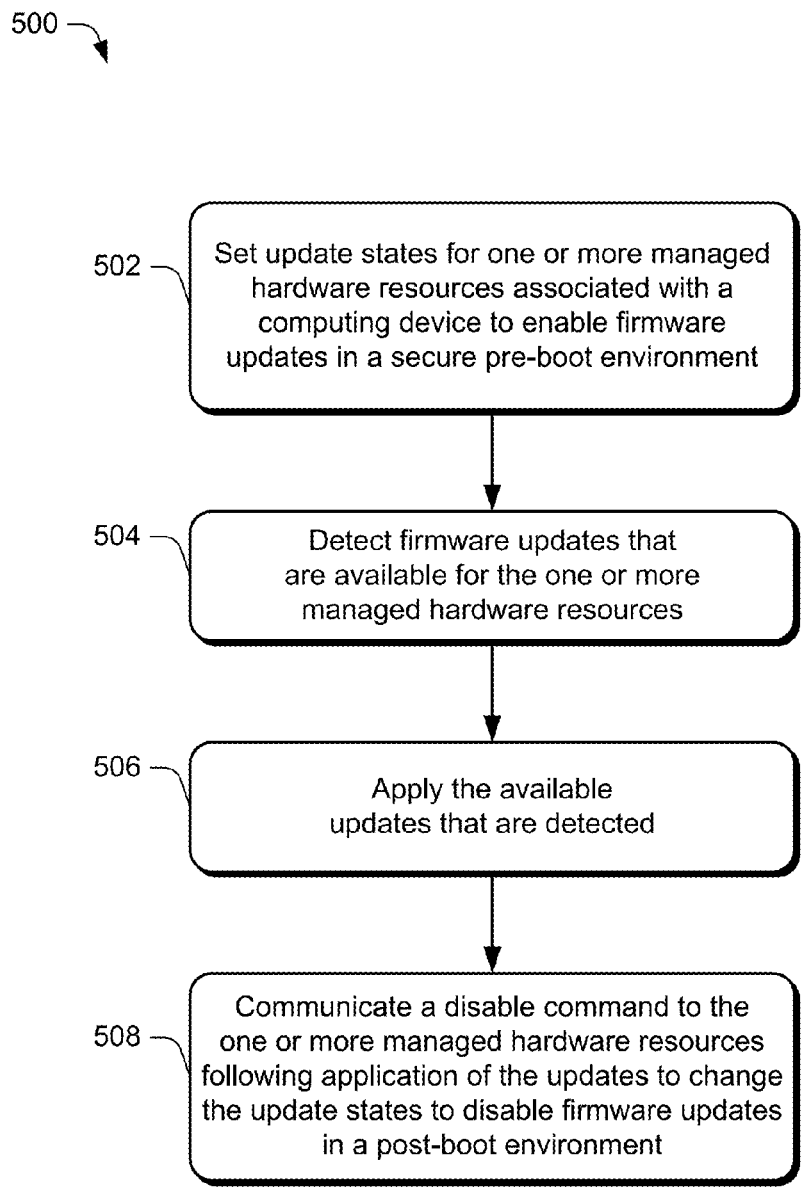
FIG. 5 is a flow diagram that describes details of still another example procedure in accordance with one or more embodiments.

FIG. 5 depicts a procedure 500 for in which update states are selectively set to implement secure firmware updates in accordance with one or more embodiments. Update states for one or more managed hardware resources associated with a computing device are set to enable firmware updates in a secure pre-boot environment (block 502). Update states may be set individually for different resources in the manner previously described. The states may be set using a designated field or other suitable data object/parameter associated with the resources. The update states may be set by default upon powering-up the system, in response to a notification/command, or otherwise.

In another approach, core system firmware for a SoC device or other designated component (e.g., a designated central processing unit (CPU), microprocessor, or controller device) may be configured as a gatekeeper, which is connected to each managed hardware resource. In this approach, firmware updates for the managed hardware resources may be updated and handled collectively through system firmware 202 corresponding to the gatekeeper device. The system firmware 202 may be responsible for distributing updates to the other resources when firmware updates are enabled. Accordingly, updates to multiple different hardware resources may be controlled by managing an update state for the SoC device or other designated gatekeeper. When the update state for the designated gatekeeper device is set to disable updates, the system firmware is configured not to distribute updates to other devices/resources. In this way, firmware updates for a group of selected devices may be enabled or disabled by managing the state associated with the designated gatekeeper device.

Updates are detected that are available for the one or more managed hardware resources (block 504) and the available updates that are detected are applied (block 506). Processing and installation of updates may occur using different firmware systems 128 and techniques in the manner previously described. Generally, this involves enumerating a group of designated hardware resources for firmware management through the system. So long as secure updates are enabled for the enumerated resources, the firmware system 128 in conjunction with the secure update module 130 may discover and deploy updates that are available for the enumerated resources. For instance, the system may obtain update packages and distribute the update packages for application of the updates by individual resources. When a designated gatekeeper device is employed, update packages formatted in accordance with the firmware system may be discovered and deployed collectively through firmware of the gatekeeper device. In some embodiments, the secure update module 130 is configured as a component of the gatekeeper device to handle secure firmware updates collectively for designated hardware resources.

A disable command is communicated to the one or more managed hardware resources following application of the updates to change the update states to disable firmware updates in a post-boot environment (block 508). This may occur just before control is passed to a boot loader to load the OS. Again, updates for resources may be disabled individually by setting update fields that are associated with each different hardware resource. When a designated gatekeeper device is employed, though, updates for resources collectively managed through the gatekeeper device may be disabled together by setting the state of the gatekeeper device itself, which disables updates for the multiple resources. Setting the state to disable prevents the gatekeeper device from distributing any firmware updates to other resources.

Having considered example details and techniques regarding secure firmware updates, consider a discussion of an example system in accordance with one or more embodiments.

Example System

Figure 6:
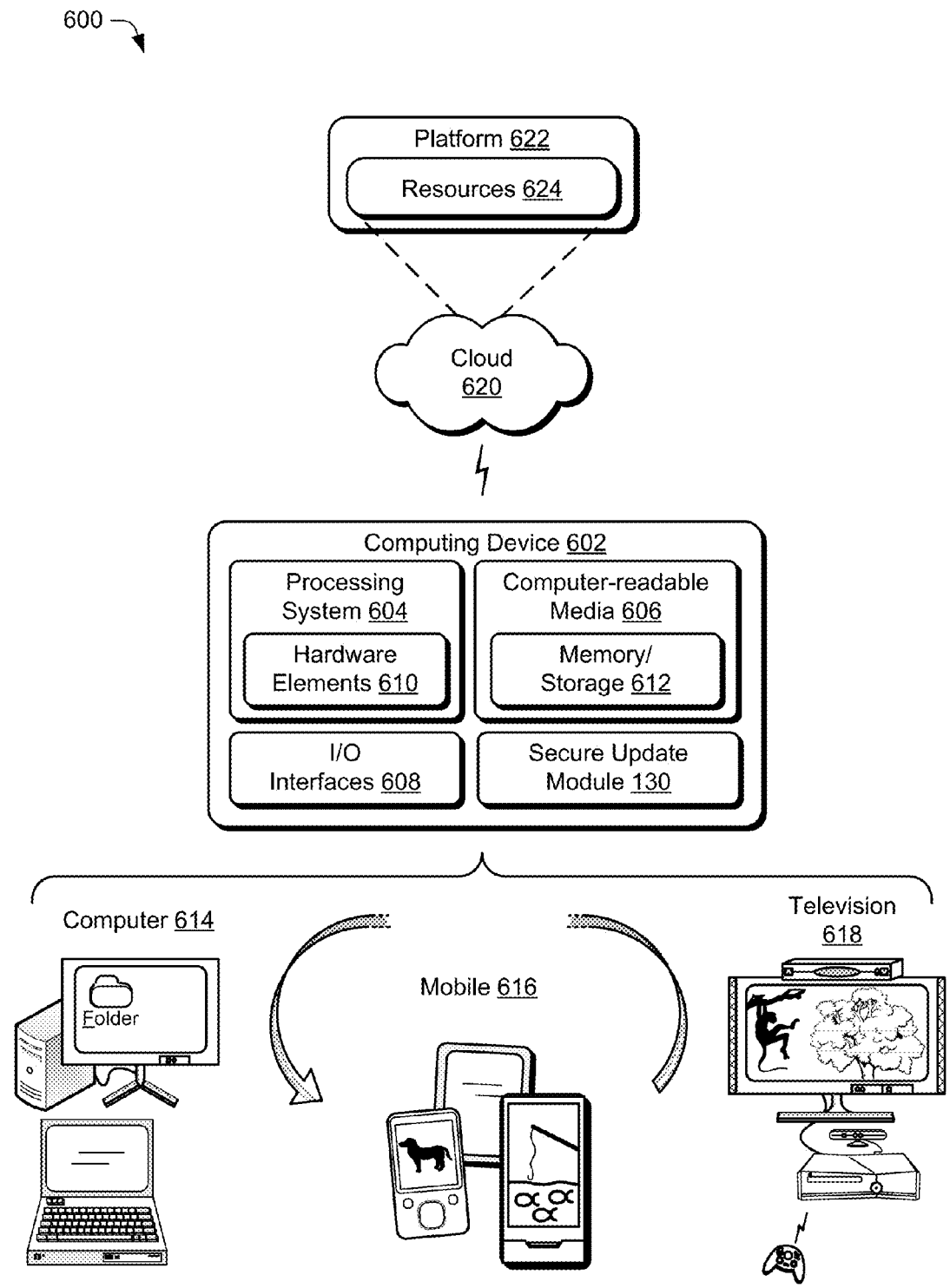
FIG. 6 is a block diagram of a system that can implement the various embodiments.

FIG. 6 illustrates an example system 600 that includes an example computing device 602 that is representative of one or more computing systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "communication media."

"Computer-readable storage media" may refer to media and/or devices that enable persistent storage of information in contrast to mere signal transmission, carrier waves, or signals per se. Thus, computer-readable storage media does not include signal bearing or transitory media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 602, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the operating system 108, applications 110, firmware system 128, secure update module 130, and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a distributed cloud environment implemented via one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This is illustrated through inclusion of the secure update module 130 on the computing device 602. The functionality represented by the secure update module 130 and other modules/applications may also be implemented all or in part through use of a distributed system, such as over a "cloud" 620 via a platform 622 as described below.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device embodiment, implementation of functionality described herein may be distributed throughout the system 600. For example, the functionality may be implemented in part on the computing device 602 as well as via the platform 622 that abstracts the functionality of the cloud 620.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computing device comprising:
   one or more hardware resources having updateable firmware; and
   memory storing a secure update module configured to:
      establish a secure pre-boot environment for start-up of the computing device;
      enable firmware updates via a firmware system for the one or more hardware resources to allow the firmware to be updated within the secure pre-boot environment; and
      disable the firmware updates for the one or more hardware resources to prevent the firmware from being updated outside of the secure pre-boot environment, the firmware updates for the one or more hardware resources being disabled based on setting a value of an update state field in a data structure corresponding to the one or more hardware resources, the setting of the value of the update state field in the data structure being effective to set a value of a corresponding field within the firmware for the one or more hardware resources to prevent the firmware from being updated outside of the secure pre-boot environment.

2. The computing device as recited in claim 1, wherein the secure update module is further configured to:
   detect updates that are available for the one or more hardware resources; and
   initiate installation of the updates that are detected in the secure pre-boot environment.

3. The computing device as recited in claim 2, wherein to initiate the installation of the updates comprises:
   obtaining update packages for the updates that are available through the firmware system; and
   distributing the packages to the one or more hardware resources to cause application of the updates by the hardware resources.

4. The computing device as recited in claim 1, wherein the secure update module is further configured to enumerate the one or more hardware resources designated for handling of firmware updates in the secure pre-boot environment by referencing a data structure populated with entries describing the one or more hardware resources.

5. The computing device as recited in claim 1, wherein the secure update module is further configured to pass control to a boot loader to boot an operating system for the computing device after disabling the firmware updates for the one or hardware resources.

6. The computing device as recited in claim 1, wherein at least some of the one or more hardware resources are provided as integrated components of a system-on-chip processor for the computing device.

7. The computing device as recited in claim 1, wherein the one or more hardware resources include an accessory device connectable to the computing device via a corresponding interface.

8. The computing device as recited in claim 1, wherein the one or more hardware resources include multiple microprocessors of the computing device.

9. The computing device as recited in claim 1, wherein the firmware system is implemented as a Unified Extensible Firmware Interface (UEFI).

10. The computing device as recited in claim 1, wherein one or more update states associated with the one or more hardware resources are set by default to enable firmware updates upon the start-up of the computing device.

11. The computing device as recited in claim 1, wherein to enable the firmware updates comprises sending an enable command to the one or more hardware resources in response to establishment of the secure pre-boot environment, the enable command configured to set one or more update states associated with the one or more hardware resources to enable the firmware updates in the secure pre-boot environment.

12. The computing device as recited in claim 1, wherein to disable the firmware updates comprises sending a disable command to the one or more hardware resources prior to booting an operating system for the computing device, the disable command configured to set one or more updates states associated with the one or more hardware resources to disable the firmware updates outside of the secure pre-boot environment.

13. A method implemented by a computing device comprising:
   determining whether a secure pre-boot environment is established by a boot program launched upon start-up of the computing device;
   when the secure pre-boot environment is established, performing firmware updates in the secure pre-boot environment for one or more hardware resources of the computing device; and
   sending at least one notification to cause the one or more hardware resources to disable firmware updates that are for the one or more hardware resources and which are outside of the secure pre-boot environment, the firmware updates being disabled based on a change to a value of an update state field in a data structure corresponding to the one or more hardware resources, the change to the value of the update state field in the data structure being effective to cause a change to a value of a corresponding field within the firmware for the one or more hardware resources to prevent the firmware from being updated outside of the secure pre-boot environment.

14. The method as recited in claim 13, wherein performing the firmware updates in the secure pre-boot environment comprises:
identifying the one or more hardware resources designated for handling of firmware updates by a firmware system of the computing device in the secure pre-boot environment;
determining whether updates are available for the identified hardware resources; and
applying firmware updates that are available by obtaining update packages configured to implement the firmware updates and distributing the update packages for consumption by the one or more hardware resources.

15. The method as recited in claim 13, wherein the secure pre-boot environment is configured to enforce a security policy that prevents un-trusted code from executing in the secure pre-boot environment.

16. The method as recited in claim 15, wherein:
the at least one notification is sent to one of said hardware resources acting as a gatekeeper device and includes a disable command to set the gatekeeper device to a disable state;
the gatekeeper device is configured to manage firmware updates collectively for at least some of said hardware resources; and
when in the disable state, the gatekeeper device is configured to not distribute firmware updates to hardware resources managed by the gatekeeper device.

17. One or more computer-readable storage media storing instructions that when executed by a computing device cause the computing device to implement a firmware system to perform acts comprising:
setting update states for one or more managed hardware resources associated with the computing device to enable firmware updates in a secure pre-boot environment;
detecting firmware updates that are available for the one or more managed hardware resources;
applying the available firmware updates that are detected when in the secure pre-boot environment; and
communicating a disable command to the one or more managed hardware resources following application of the firmware updates to change the update states to disable additional firmware updates when in a post-boot environment, the change to the update states being based on a value being set of an update state field in a data structure corresponding to the one or more managed hardware resources, the value being set of the update state field in the data structure being effective to set a value of a corresponding field in the firmware for the one or more managed hardware resources to prevent the firmware from being updated outside of the secure pre-boot environment.

18. One or more computer-readable storage media of claim 17, wherein setting update states comprises communicating an enable command to the one or more managed hardware resources responsive to a determination that the secure pre-boot environment is established by boot code of the computing device.

19. One or more computer-readable storage media of claim 17, further comprising:
prior to applying the available firmware updates, determining whether available firmware updates are trusted in accordance with a security policy implemented by the secure pre-boot environment by verifying digital signatures associated with the available firmware updates, wherein the applying comprises applying updates that are trusted based on the determination.

20. One or more computer-readable storage media of claim 17, wherein the disable command is sent to a component configured as a gatekeeper for the one or more hardware resources to collectively manage firmware updates for the one or more hardware resources through associated system firmware, the disable command configured to prevent the associated system firmware from distributing firmware updates outside of the secure pre-boot environment to the one or more managed hardware resources.

* * * * *